United States Patent
Mohanta et al.

(10) Patent No.: US 9,015,527 B2
(45) Date of Patent: Apr. 21, 2015

(54) DATA BACKUP AND RECOVERY

(71) Applicant: Hewlett-Packard Development Company, L.P., Houston, TX (US)

(72) Inventors: Taranisen Mohanta, Bengaluru (IN); Sameer Madhu Nadagouda, Bengaluru (IN); Govindaraja Nayaka B, Bengaluru (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 13/752,646

(22) Filed: Jan. 29, 2013

(65) Prior Publication Data

US 2014/0215265 A1    Jul. 31, 2014

(51) Int. Cl.
*G06F 11/14*    (2006.01)

(52) U.S. Cl.
CPC .................................. *G06F 11/1412* (2013.01)

(58) Field of Classification Search
CPC ............ G06F 11/1412; G06F 11/1469; G06F 11/2023; G06F 11/1448; G06F 11/2046; G06F 11/1453; G06F 11/1456; G06F 3/067; G06F 3/0608
See application file for complete search history.

(56) References Cited

U.S. PATENT DOCUMENTS

| | | | |
|---|---|---|---|
| 6,571,354 B1 * | 5/2003 | Parks et al. | 714/6.32 |
| 7,062,628 B2 * | 6/2006 | Amano | 711/170 |
| 7,188,218 B2 * | 3/2007 | Morishita et al. | 711/147 |
| 7,770,057 B1 | 8/2010 | Graham et al. | |
| 8,051,205 B2 | 11/2011 | Roy et al. | |
| 8,103,622 B1 * | 1/2012 | Karinta | 707/609 |
| 8,694,469 B2 * | 4/2014 | Parab | 707/640 |
| 2009/0187609 A1 | 7/2009 | Barton et al. | |
| 2010/0205231 A1 * | 8/2010 | Cousins | 707/823 |
| 2010/0274983 A1 * | 10/2010 | Murphy et al. | 711/162 |
| 2012/0084261 A1 * | 4/2012 | Parab | 707/654 |

OTHER PUBLICATIONS

IBM Research-Almaden, http://www.almaden.ibm.com/projects/datalinks.shtml.

* cited by examiner

*Primary Examiner* — Nadeem Iqbal
(74) *Attorney, Agent, or Firm* — Trop, Pruner & Hu, P.C.

(57) ABSTRACT

Techniques for data backup and recovery are described. In one implementation, at least one storage device storing original data which has failed is determined. Once the failed storage device is determined, backup related information corresponding to the failed at least one storage device is determined. Based on the backup related information at least one backup of the original data from a storage unit is identified. The backup as identified is eventually used for recovering data corresponding to the original data.

17 Claims, 4 Drawing Sheets

DATA BACKUP AND RECOVERY

BACKGROUND

Recent advancements in information technology have seen a tremendous growth in large number of organizations automating different business functions. The business functions can be implemented by way of computer based applications, such as enterprise applications. These applications utilize and generate large amounts of data or information, based on which the business functions may be performed, forms the bases for ensuring continuity of such business functions. The data can be stored in large data centers.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
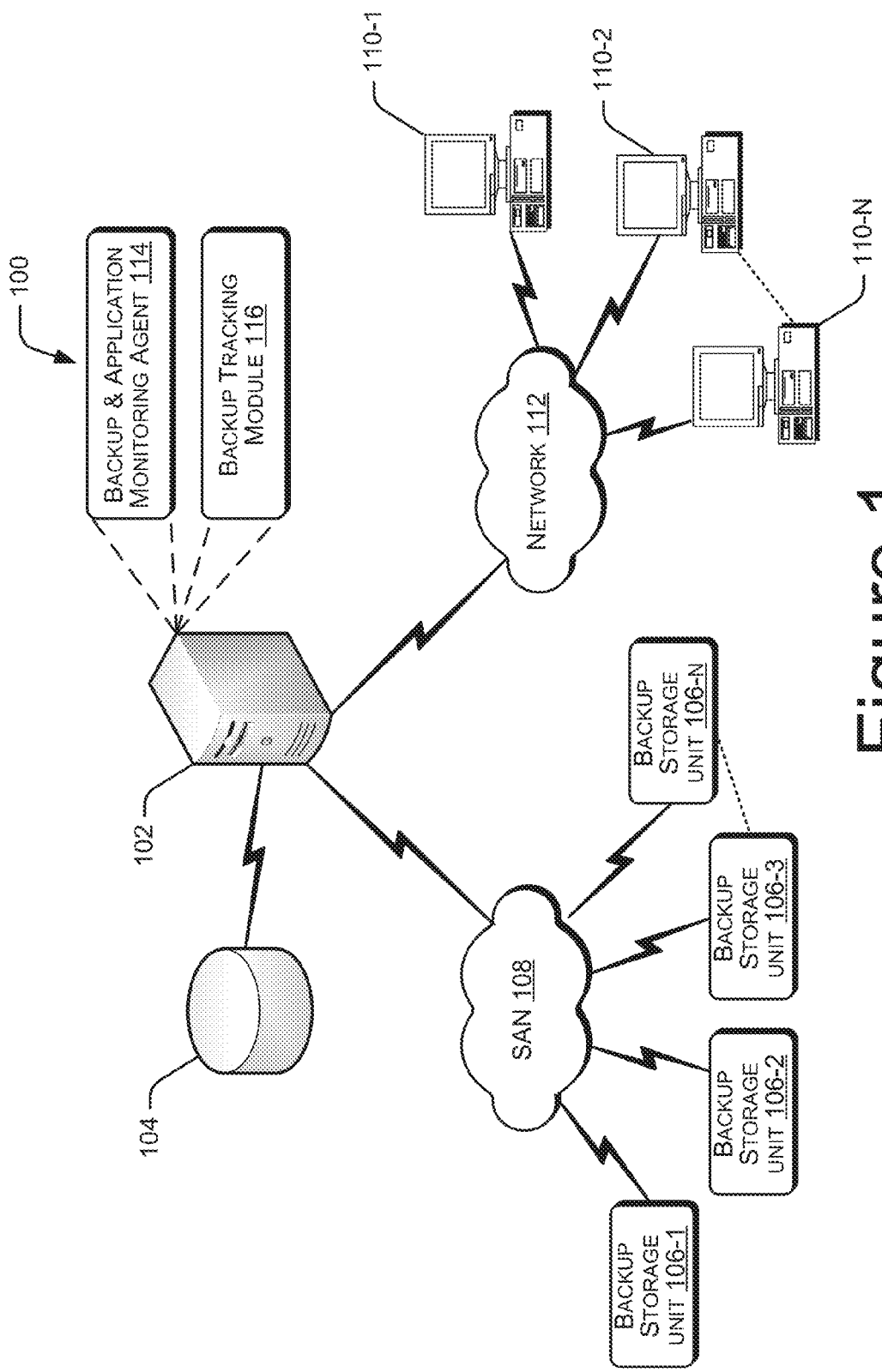
FIG. 1 schematically illustrates a network environment implemented for data backup and recovery, according to an embodiment of the present subject matter.

As explained above, applications can utilize and generate large amounts of data or information, based on which the business functions may be performed, forms the bases for ensuring continuity of such business functions. The data can be stored in large data centers. In cases of failure related situations, as experienced during a disaster, the actual data may become unavailable either temporarily or permanently. The unavailability of the data can adversely affect the business continuity of the organization and the organization's productivity. To this end, the data can be backed-up and stored at different remote locations. The data can be stored on variety of mediums such as magnetic tape or optical disks. In case the data is to be recovered after a disaster or a system failure, the backed up data can be made available, as and when required.

The manner in which the data can be restored or recovered depends on a variety of factors, such as complexity of the data structure that is to be restored, the topography of the storage network over which the data has been stored, and so on. Furthermore, different service level agreements may also dictate the manner in which the data access can be restored. For example, a recovery administrator may be required to provide access to business critical data as quickly as possible, with the other data being provided over an extended period of time. An efficient mechanism for providing data backup and recovery is therefore desired.

The present subject matter relates to systems and methods for a data backup and data recovery in a computing network. With increase and advancements in information technology, the reliance of various organizations on automation has significantly increased. Such organizations use a variety of computer based applications, such as enterprise applications, for implementing a variety of business functions. These applications may use large amounts of original data or information, based on which the business functions may be performed. The original data is typically stored and maintained in storage devices in large data centers.

In order to ensure that business continuity persists in the event of unforeseen circumstances, such as a natural disaster, organizations may protect the data by periodically backing up or storing the data onto a backup storage. The backup storage can be implemented using removable storage mediums such as magnetic tape drives, optical disks, hard-disk drives, or can be implemented within storage topology like Storage Area Network (SAN), Network-Attached Storage (NAS) and Direct-Attached Storage (DAS). Such storage media can be deployed at different backup storage locations which may be spatially remote from the location where the organization is present.

As mentioned briefly before, conventional backup and storage systems allow the data to be recovered from the backup storage locations. Once recovered, the same can be made available for access by the different applications being used by the organization, in the event of the data rendered unavailable due to failure of storage devices storing the original data. Such conventional recovery processes however are highly localized processes, i.e., the recovery process are mainly dependent on backup storage location where the backed up data may be available. Furthermore, in cases where the backed up data is distributed over storage media available across different locations, manual intervention by a recovery administrator would be required so as to determine from which backup storage location the data should be retrieved. This is likely to affect the efficiency of the recovery process, and in turn the business functions of an organization.

In some circumstances the data recovery can also be subject to various service level agreements or SLAs. Typically, in case of recovery of data, the SLAs may prescribe the order in which the data is to be recovered. For example, the SLAs may require a recovery administrator to restore access to business critical data as soon as possible, so as to minimize the effects on business continuity due to the failure of the storage devices. Other data which might not be as critical can be reserved for recovery at later stages or at later time instances. In case the data recovery is based the SLAs, the failure recovery might contribute to the complexity of the recovery process.

Systems and methods for data backup and recovery are described. In one implementation, the recovery of the data from a backup is based on information associated with at least one backup storage location storing the backup data. To implement data backup and recovery, a repository of backup storage information is maintained. In one implementation, the backup storage information repository includes information providing an association of the backups that have been taken for data being used with applications which would have been using the original data. The original data in turn would have been available on a storage device. Such a storage device would be accessed by the applications for carrying out business functions, as briefly mentioned above. The required backup data can be identified by one or more identifiers for the storage devices storing the original data. In one implementation, the required backup data can be identified based on a logical unit number, or LUN, of the storage device storing the data under consideration.

Generally, LUN is used to specify storage devices which can support read-write operations. Therefore, a specific application would be reading from and writing to a storage device having a specified LUN. Furthermore, a reference to LUN can be considered to be indicative of an identifier such as a LUN ID, or can be considered as a reference to the storage location storing data for access by the applications.

The backup storage information repository (interchangeably referred to as the information repository) can also include other information associated with the storage device, or a LUN. Further examples of such information include, but are not limited to data source information, host information, type of application, type and identity of backup device, backup ID, destination information, etc., for the corresponding LUN. The information repository can be updated at regular intervals. For example, the information repository can be updated as and when the backups are taken.

The recovery process can be initiated in the event of a system failure. In such a case, the storage devices within the data storage used by the applications may become unavailable. For example, in the event of a natural disaster the LUNs having the stored original data may become unavailable. Based on the LUN ID the appropriate backup data can be obtained, based on which the data can be recovered.

In one implementation, each of the LUNs can be further associated with a LUN priority. In case multiple LUNs are detected as failed, the recovery of the backup data can be based on the LUN priority. The priority information of each of the LUNs can be maintained in a list. Once detected as failed, the listing of the plurality of failed LUNs can be sorted based on the priority information. Based on the sorting, the high priority failed LUNs can be identified, and their respective backups can be identified. Once identified, the data associated with the higher priority failed LUNs can be recovered first. The LUN priority associated with each of the failed LUNs can be specified by a system recovery administrator.

In one implementation, a plurality of backups may be available for each of the identified failed LUN. Each of the backups associated with the failed LUN can be further associated with a plurality of parameters. Based on the parameters, each of the plurality of backups available for the failed LUN are analyzed with respect to a recovery policy. Based on the comparison, one of the available backups is then used for data recovery. In another implementation, the backups associated with the failed LUN can be further checked for validating whether the backed up data can be utilized for recovering the data.

Once the appropriate and checked backup is determined, the backups can be used for restoring access to data relied upon by the applications, say within an enterprise application. In one implementation, a fresh LUN can be created. The fresh LUN may be associated with the same identifiers as those associated with the previously failed LUN. Once the new LUN is obtained, the data obtained from the backup is transferred to the fresh LUN. Once transferred, the fresh LUN can be presented to the host device which was previously associated with the failed LUN.

The present subject matter avoids selection of the appropriate backups based on subjective assessment of the datacenter administrator. Furthermore, since the backups for the failed LUNs are readily determinable, the data backup and recovery process ensures that the data recovery is efficient and predictable. The present subject matter also allows data recovery in cases where the backups are maintained on a cloud environment. Such backups can be efficiently identified for the failed LUNs and the data can be recovered accordingly. The systems and methods as described further allow storage administrators to ensure that the data recovery conforms to the conditions prescribed in a business SLA.

The above systems and methods are further described in conjunction with the following figures. It should be noted that the description and figures merely illustrate the principles of the present subject matter. It will thus be appreciated that to implement various arrangements that, although not explicitly described or shown herein, fall within the scope of the present subject matter. Furthermore, all examples recited herein are principally intended expressly to be only for illustrative purposes, and are to be construed as being without limitation to such specifically recited examples and implementations. Moreover, all statements herein reciting principles, aspects, and implementations of the present subject matter, as well as specific examples thereof, are intended to also cover equivalents thereof.

Figure 2:
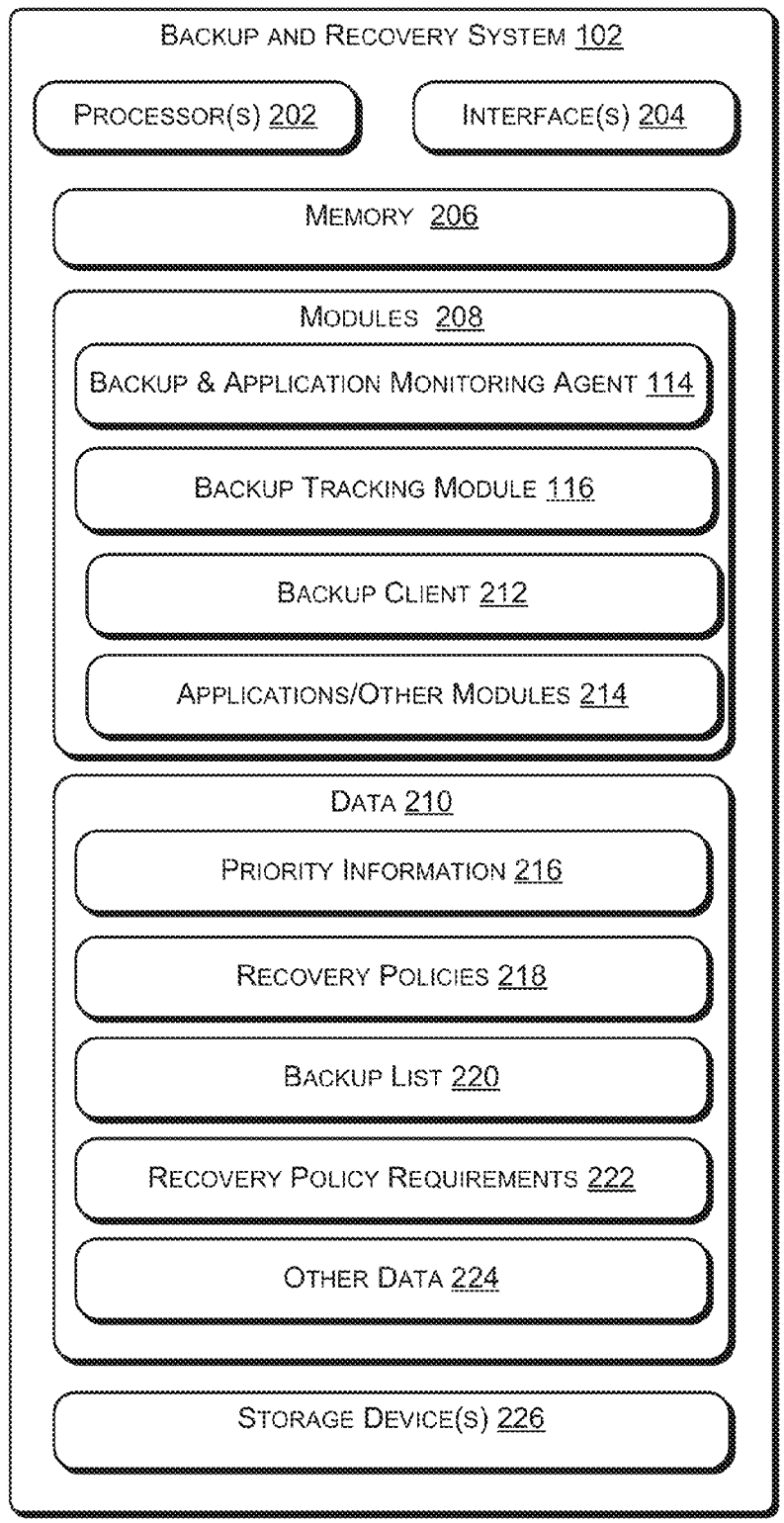
FIG. 2 schematically illustrates a data backup and recovery system, according to an embodiment of the present subject matter.

The manner in which the systems and methods for data backup and recovery are implemented shall be explained in details with respect to FIGS. 1-3. While aspects of described systems and methods of the present subject matter can be implemented in any number of different computing systems, environments, and/or configurations, the embodiments are described in the context of the following system(s).

Additionally words 'during', 'while', 'when', and 'upon' as used herein are not exact terms that mean as action takes place instantly upon an initiating action but that there may be some small but reasonable delay, such as propagation delay, between the initial action and the reaction that is initiated by the initial action.

FIG. 1 schematically illustrates a data backup and recovery environment 100 implemented for data backup and recovery. In one implementation, the environment 100 includes backup and recovery system 102. The backup and recovery system 102 is communicatively linked to a backup storage information repository 104 (interchangeably referred to as the repository 104). The repository 104 can be implemented as a database, such as a Relational Database Management System (RDBMS). The environment 100 further includes a plurality of backup storage units 106-1, 106-2, . . . , 106-n, collectively referred to as backup storage units 106. Examples of such backup storage units 106 include, but not limited to, storage array, tape drive, virtual tape library (VTL), optical drive, etc. Each of the backup storage units 106 can be communicatively associated with the backup and recovery system 102 by way of a storage area network (SAN) 108. The different backup storage units 106 providing storage capabilities can be such that they form a part of SAN 108. The SAN 108 can further include other types of backup storage units, which otherwise not shown, but which fall within the scope of the present subject matter.

The environment 100 further includes a plurality of client devices 110-1, 110-2, 110-3 . . . , 110-n (collectively referred to as client devices 110). In one implementation, the client devices 110 can be associated with multiple users within an organization. The users may through their respective client devices 110 can access the applications which may be hosted on an application server (not shown in FIG. 1). These applications are such that may be used by the users for carrying out a variety of business functions within the organization. In operation and during execution, the applications may access original data stored in the storage devices. Each of the client devices 110 can communicate with the backup and recovery system 102 over network 112.

The SAN 108 and the network 112 may be implemented as a wireless network or a wired network, or a combination thereof. The SAN 108 and the network 112 can each be an individual network, or can be collectively implemented as part of a single network implementing the functionalities of a storage area network and of providing a communication pathway for inter-device communication. The network 112 can be implemented as one of the different types of networks, such as local area network (LAN), wide area network (WAN), and such. The network 112 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Furthermore, it should be understood that, each of the client devices 110 may utilize communication protocols that are compatible with the network 112, to effectively communicate with other entities within the environment 100.

The interaction of the client devices 110 with the various applications might be dependent on large amounts of data. Such data might exist previously or can be generated as a result of the execution of the applications implementing the business functions under consideration. The data can be placed on a central location using known techniques.

In order to ensure that the data is available in the event of a failure arising, say due to a natural disaster, the data can be periodically backed up. It should be understood that backing up of data can refer to a process in which the various copies of the original data are created, or backed up. The copies, known as a backup or backed up data, can be later utilized for restoring or recovering the original data that became unavailable due to a system failure. The backing up of the original data can be implemented using various backup tools. Such backup tools can either be standalone applications or can be implemented as modules within applications supporting other functionalities.

The backup once obtained, is stored in storage locations other than the locations which host the applications under consideration. In one implementation, the backup can be stored in the backup storage units 106. The backup storage units 106 can be deployed at locations which are geographically remote from the location where the server hosting the applications is present. In the event of a system failure where the original data becomes unavailable, the same can be recovered from the backup stored in the backup storage units 106.

The repository 104 includes information associated with the backup stored in the backup storage units 106. The information within the repository 104 can indicate which backup within the backup storage units 106 corresponds to the failed LUN, and in turn to the original data. Examples of the information within the repository 104 include, but are not limited to source information, host information, LUN information, and so on. Furthermore, the source information may include a customer or an application ID, time of backup, source ID, destination ID identifying the source which holds the original data and the destination where the backed up data would be stored, respectively.

In one implementation, the original data used by the application can be associated with LUN, i.e., a logical unit number. Generally, LUN is used to specify storage devices which can support data read-write operations. In some cases, the LUN can be considered as indicating the memory location within which the original data being currently being accessed by the client devices 110, resides. As also stated previously, reference to LUN can be considered to be indicative of an identifier, such as a LUN ID, or can be considered as a reference to the storage location within a storage device storing the original data for access by the applications.

The backup and recovery system 102 further includes two modules—backup and application monitoring agent 114 and a data backup tracking module 116. The backup and application monitoring agent 114, interchangeably referred to as the monitoring agent 114, monitors the backups that have been taken for the original data. In another implementation, the backup tool can be configured to inform the monitoring agent 114 that a backup of the original data has been taken.

The data backup and recovery may involve a preparation stage and a recovery stage. In the preparation stage, the monitoring agent 114 determines all the available backups for all LUNs with the original data. In one implementation, a determination of all available backups can be performed at the instance a backup process is initiated for a specific LUN. While determining the available backups for the LUN, the monitoring agent 114 may determine a series of information associated with the backup. For example, the monitoring agent 114 may determine source of data, type of application which corresponds to the original data being backed up, type and identity of the backup device, backup ID, to name a few. These other parameters as provided in the above mentioned examples can also be determined by the monitoring agent 114 without deviating from the scope of the present subject matter. Once determined, the monitoring agent 114 communicates the obtained information to the backup tracking module 116. The backup tracking module 116 on receiving such information, may store the same in the repository 104.

It may happen that the original data may become unavailable due to a system failure, at a later instance. The failure could be attributed due to unforeseen circumstances, such as an occurrence of a natural disaster. For example, the monitoring agent 114 may determine that a LUN corresponding to certain portion of the original data has faded, thereby initiating the recovery phase. The monitoring agent 114, on determining that a specific LUN has failed, communicates the information associated with the failed LUN to the backup tracking module 116. The backup tracking module 116 on receiving the information associated with the failed LUN, may determine one or more backups that correspond to the failed LUN. In case the backup tracking module 116 determines a single backup to be available for the corresponding failed LUN, the same is obtained, say from the backup storage units 106. Once obtained, the data corresponding to the original data is recovered based on the backup.

It may also be the case, that the resultant system failure renders multiple LUNs unavailable. On determining that multiple LUNs have failed, the monitoring agent 114 may further determine a priority index associated with each of the failed LUNs. The respective LUNs along with their corresponding priority index can be stored within a list. With the priority index obtained, the monitoring agent 114 sorts the list of the failed LUNs based on the associated priority index. For example, data previously existing in LUNs having a higher priority would be recovered first, when compared to data in other LUNs. Sorting as per a priority index allows for greater flexibility while recovering the original data. This allows a recovery administrator to determine which data to restore first, thereby minimizing the losses experienced by the failing of the LUN with the original data.

Returning to the present implementation, once the LUNs have been sorted based on the priority index, the backup tracking module 116 determines the backups for the corresponding failed LUNs. The various backups for the corresponding failed LUNs can be further analyzed to determine the most appropriate backup, based on which the original data can be obtained. In one implementation, the most appropriate backup for recovering the original data can be determined based on at least one a recovery policy.

FIG. 2 illustrates the backup and recovery system 102 according to one implementation of the present subject matter. The backup and recovery system 102 includes a processor 202, interface 204 and memory 206. The processor 202 may be implemented as microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory.

The functions of the various elements shown in the figure, including any functional blocks labeled as "processor(s)", may be provided through the use of dedicated hardware as well as hardware capable of executing software, in the form of machine readable instructions, in association with appropriate hardware. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interfaces 204 may be implemented as a variety of software and/or hardware interfaces that allow the backup and recovery system 102 to interact with other entities within the environment 100, for example, with the client devices 110. The interfaces 204 may facilitate multiple communications within a wide variety of networks and protocol types, including wire networks, for example, LAN, cable, etc., and wireless networks, for example WLAN, cellular, satellite-based network, etc.

The backup and recovery system 102 further includes memory 206. The memory 206 may include any non-transitory computer-readable medium, for example, volatile memory (e.g., RAM), and/or non-volatile memory (e.g., EPROM, flash memory, etc.). In one implementation, the backup and recovery system 102 further includes modules 208 and data 210. In one implementation, the modules 208 are coupled to processor 202. The modules 208 include routines, programs, objects, components, data structures, and the like, which perform particular tasks or implement particular abstract data types. The modules 208 further include modules that supplement applications on the backup and recovery system 102, for example, modules of an operating system. The data 210 serves, amongst other things, as a repository for storing data that may be fetched, processed, received, or generated by the modules 208.

In one implementation, the modules 208 further includes backup and application monitoring agent 114, backup tracking module 116, backup client 212, and application/other modules 214. On the other hand, the data includes priority information 216, recovery policies 218, backup list 220, recovery policy requirements 222 and other data 224. In one implementation, the backup related information may include priority information 216 and the recovery policies 218. As per FIG. 1, the priority information 216 and the recovery policies 218 are shown to be included within the backup and recovery system 102 for sake of illustration only. However, the same can be included in repository 104 or any other data store without deviating from the scope of the present subject matter.

The application/other modules 214 are such that supplement the functioning of the backup and recovery system 102. The applications 214 can include such applications and programs that implement the business functions of an organization. For example, for banking or a financial institution, such applications 214 may include modules responsible for determining the outstanding bank balance of different individuals. For the purposes of the present description and for ease of illustrating the working of the present subject matter, the applications 214 have been depicted as hosted on the backup and recovery system 102. However, the applications can be hosted on dedicated systems like an application server, without deviating from the scope of the claimed subject matter.

In operation, the applications 214 may utilize or generate the original data. The original data can be stored in a plurality of storage devices 226. In the present implementation, the storage devices 226 are indicated as included within the backup and recovery system 102. However, the same can be implemented externally and remote from the backup and recovery system 102. For example, the storage devices 226 can be implemented as part of other central storage locations, such as data centers, which in turn, include a plurality of storage devices 226. Furthermore, any reference to a storage device 226 would include a reference to a physical storage device or a logical partition within a physical storage device.

Each of the storage devices 226 can be associated with an identifier, for example a logical unit number (LUN). The backup client 212 within the backup and recovery system 102 can be configured to regularly take backups of the original data. The manner in which the backups are taken by the backup client 212 can be based on known techniques. Once the original data has been backed up, the backups can be stored in the backup storage units 106.

In one implementation, the monitoring agent 114 determines all the available backups for all LUNs with the original data. In one implementation, a determination of all available backups can be performed once the backup client 212 has initiated the backup process. While determining the available backups for the LUN, the monitoring agent 114 may determine the source of data, type of application which corresponds to the original data being backed up, type and identity of the backup device, backup ID, location of the backup, time when the backup was taken to determine the age of the backup, time needed to recover the lost data, nature of backup, etc. Other parameters, provided by way of examples above, can also be determined by the monitoring agent 114 without deviating from the scope of the present subject matter. Once determined, the monitoring agent 114 communicates the obtained information to the backup tracking module 116. The backup tracking module 116 on receiving such information, stores the backup related information in the repository 104.

As discussed previously, the data centers managing the original data may experience a failure due to system related issues or due to unforeseen circumstances, such as the occurrence of a natural disaster. In such a case, the original data may no longer be available due to the applications 214. In one implementation, the monitoring agent 114 determines the LUN which have become unavailable to the applications 214.

On determining that at least one LUN have failed, the monitoring agent 114 communicates the information associated with the failed LUNs to the backup tracking module 116. In case the monitoring agent 114 determines that only a single LUN has failed, the backup tracking module 116 determines the available backup corresponding to the failed LUN. The available backup is subsequently obtained, say by the backup client 212 and subsequently used for recovering the original data previously stored in the failed LUN.

In one implementation, the backup tracking module 116 determines multiple backups for the corresponding failed LUN. The multiple backups may have been taken either at different instances of time. In one implementation, the multiple backups may also correspond to different types of backups. For example, the backup may be one of an incremental backup, full backup, multilevel incremental backup, block and byte level incremental backup, differential backup, synthetic backup, etc. In case multiple backups are available, the backup tracking module 116 determines the appropriate backups that can be utilized for recovering the original data lost due to the failed LUN. The number of backups that can be identified can be one or can be more than one.

In one implementation, the backup tracking module 116 determines the appropriate backups based on the recovery policies 218. Each of the failed LUNs can be associated with recovery policies 218.

In one implementation, the recovery policies 218 associated with each of the LUNs can be based on a plurality of parameters. Examples of such parameters include but are not limited to, time of the backup, time required for recovering data from backup, nature of backup and media type. Once the parameters are obtained, in one implementation, the required recovery policies 218 can be specified by assigning relative priorities to each parameter. For example, the user may assign priority values to each parameter, such as {1, 2, 3 and 4} with 1 being the highest priority and 4 being the lowest. As would be discussed in the following sections, the recovery policies 218 comprised of the parameters and their associated priorities can be used as the basis for determining whether a backup under consideration can be used for recovering data.

Returning to the present implementation, the backup tracking module 116 determines that multiple backups are available for the failed LUN under consideration. Subsequently, the backup tracking module 116 may further determine recovery policy requirements 222. The policy requirements 222 may be further based on user provided input. The recovery policy requirements 222 may indicate the requirements based on which the original data is to be recovered. In most circumstances, the recovery policy requirements 222 may be based on a variety of prerequisites which may have been specified as part of service level agreement (SLA), or can be based on Recovery Point Objective (RPO) or Recovery Time Objective (RTO) related considerations. Once the recovery policy requirements 222 are determined, the backup tracking module 116 may compare the same with the recovery policies 218 associated with each of the multiple backups. The backups for which the recovery policies 218 matches the recovery policy requirements 222 are subsequently listed within the backup list 220. Besides the RPO and RTO considerations, in one implementation, the recovery polices 218 may also indicate parameters for providing an automatic or manual confirmed recovery, priority of the RTO or RPO considerations, preferred storage array to recover, etc.

The above may be better understood with the following example. However, it should be noted that the same is provided for sake of illustration and should not be considered as limiting the scope of the present subject matter. As briefly discussed previously, the backup related information stored in the repository 104 can indicate different attributes associated with the backups. For example, the backup related information may indicate the time at which the backup was taken thereby indicating its age, along with the time that would be required for obtaining recovering the data from the backup. The backup tracking module 116 further determines whether the policy requirements 222 relate to RPO or RTO based considerations. RPO based techniques can be relied on to indicate the maximum time period for which data might be lost. On the other hand, RTO based techniques can be relied on to indicate the time period within which the business function, which is affected as a result of the failed LUN, should be restored. If the backup tracking module 116 determines that the policy requirements 222 are based on RPO, then the backup having the most recent time stamp (i.e., the most recent backup) is selected as the backup for recovering the data lost due to the failed LUN. In case the policy requirements 222 are based on RTO, then the backup, for which the recovery time would be minimum, is selected as the appropriate backup for affecting the data recovery.

It may also be the case, that the resultant system failure renders multiple LUNs unavailable. The monitoring agent 114, on determining multiple LUNs to have failed, may further determine a priority index associated with each of the failed LUNs. For example, some LUNs may hold data which is critical to the business function, and hence are sought to be recovered as quickly as possible. Such LUNs can be associated with a higher priority index. During recovery, the LUNs having the higher priority index are then recovered prior to other LUNs associated with a lower priority index. The priority index associated with each of the LUNs can be stored as priority information 216. In one implementation, the priority information 216. With the priority index obtained, the monitoring agent 114 sorts the list of the failed LUNs based on the associated priority index. For example, data previously existing in LUNs having a higher priority would be recovered first, when compared to data in other LUNs. Once data corresponding to the high priority LUNs is recovered, the data for the low priority LUNs can be recovered.

Once the LUNs have been sorted based on the priority information 216, the appropriate backups for each of the failed LUNs are identified. The manner in which the appropriate backups are identified can be based on the recovery policies 218 and recovery policy requirements 222, as described previously. In another implementation, a further pre-restore sanity check can be performed for the identified backups. The pre-restore check can be implemented by the recovery administrator, say by way of scripts. In one implementation, the pre-restore check may determine issues that may likely arise once the restore process is initiated for a specific backup. For example, the respective scripts for checking the accessibility, availability and security issues of the backup storage units 106 while restoring data may be checked.

Figure 3A:
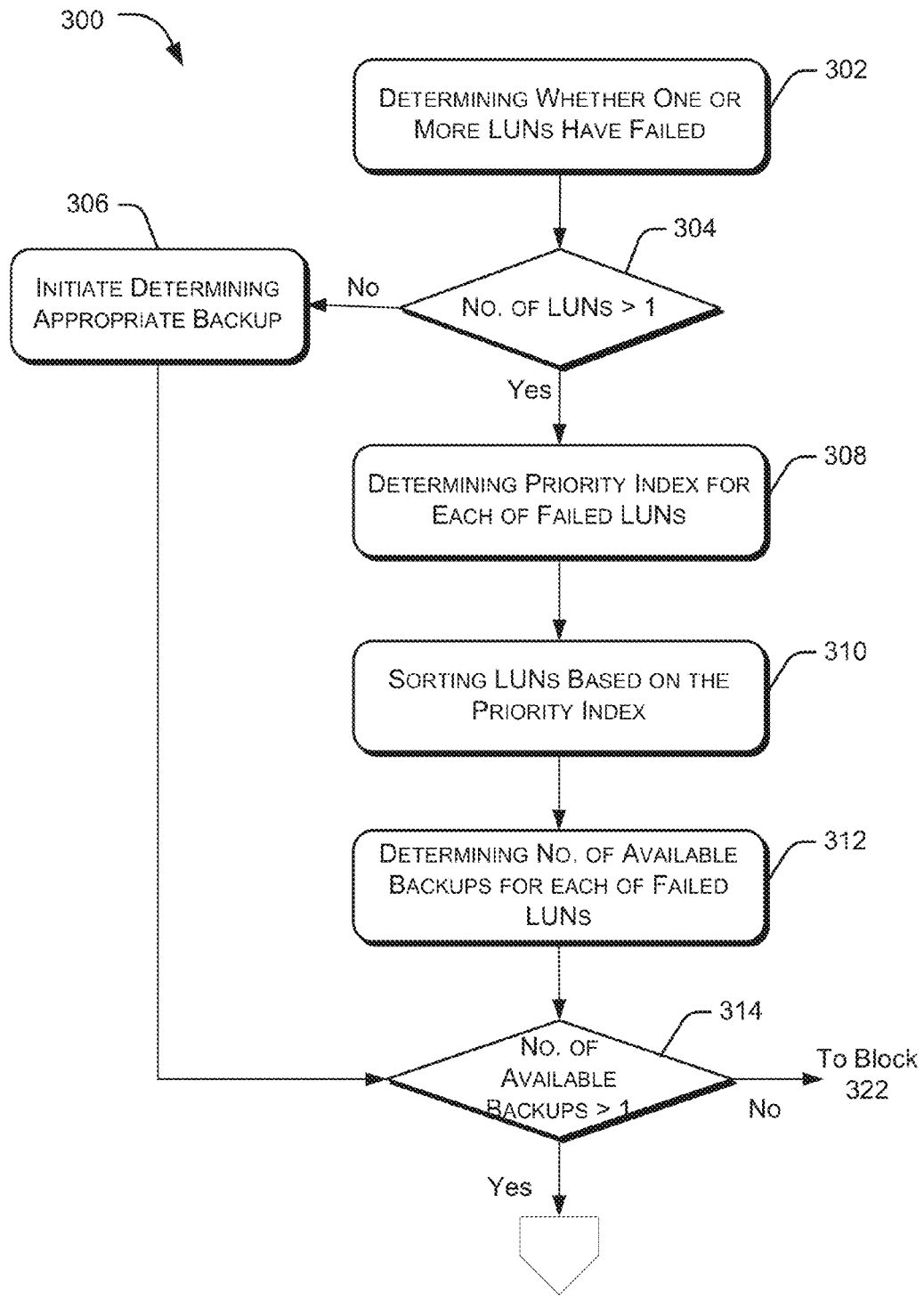
FIGS. 3a-3b schematically illustrates a method for data backup and recovery, according to an embodiment of the present subject matter.
Figure 3B:
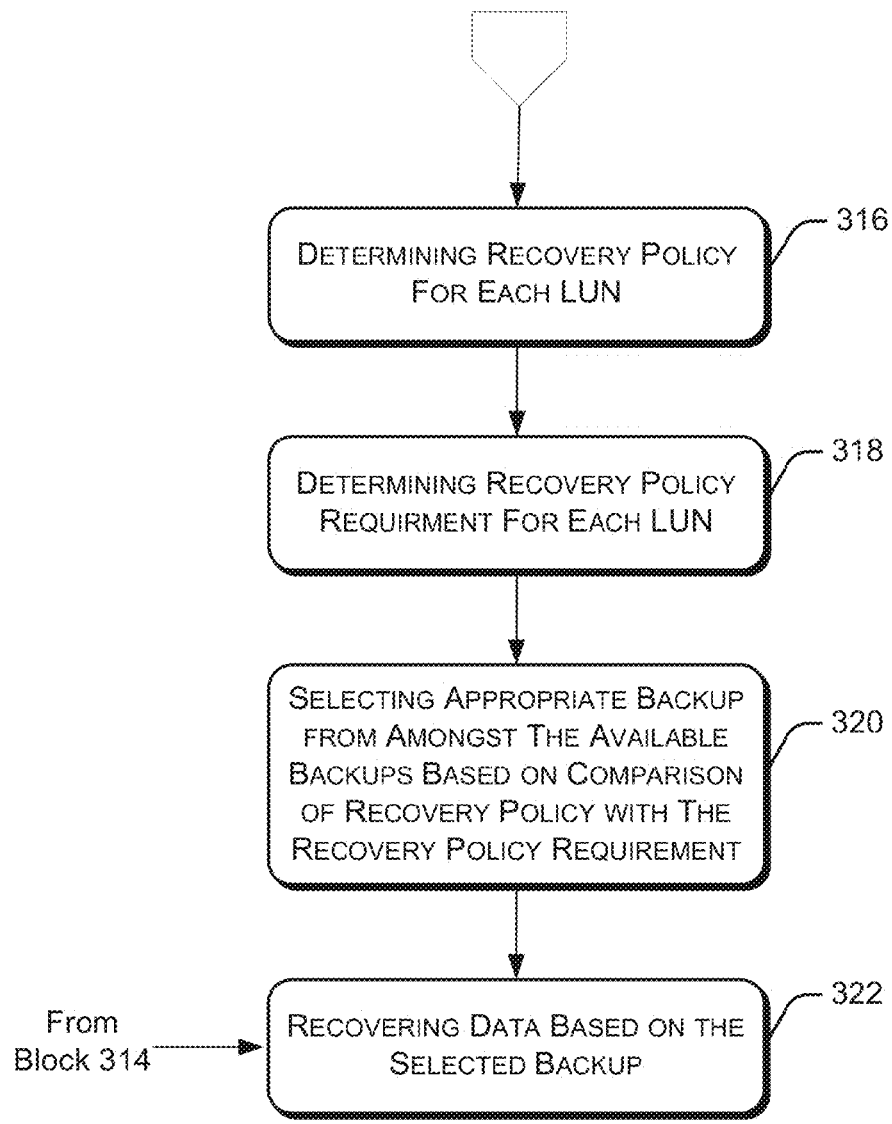

FIGS. 3a and 3b illustrates method 300 for data backup and recovery in a data backup and recovery environment 100, in accordance with an embodiment of the present subject matter. The order in which the various steps of method 300 are described is not intended to be construed as a limitation, and any number of the described method blocks can be combined in any order to implement the method 300, or an alternative method. Additionally, individual blocks may be deleted from the method 300 without departing from the spirit and scope of the subject matter described herein. Furthermore, the method 300 can be implemented in any suitable hardware, software, firmware, or combination thereof.

It should be understood that steps of the method 300 can be performed by programmed computing devices. Herein, some embodiments are also intended to cover program storage devices, for example, digital data storage media, which are machine or non-transitory computer readable and encode machine-executable or computer-executable programs of instructions, wherein said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication system configured to perform said steps of the method.

Further, although the method 300 for data backup and recovery may be implemented in a variety of communication systems working in different communication network environments, in embodiments described in FIG. 3, the method 300 is explained in context of the aforementioned backup and recovery system 102, for the ease of explanation.

Referring to FIGS. 3a-3b, in an implementation, at block 302, the storage devices which have failed, for example the failed LUNs, are determined. For example, the monitoring agent 114 continuously monitors all LUNs available within an organizational network for failures. As discussed previously, the failures may arise due to technical reasons or due to occurrence of a natural disaster.

At block 304, the number of LUNs that have failed, is determined. For example, the monitoring agent 114 determines the number of LUNs that have failed as a result of which the original data is no longer available for applications, such as applications 214. If the monitoring agent 114 determines that only one LUN has failed ('No' path from block 304), the details of the failed LUN is communicated to the backup tracking module 116. The backup tracking module 116 based on the information received from the monitoring agent 114 initiates determining the appropriate backups for the failed LUN (block 306). From block 306, the method proceeds to block 314, which is discussed in later sections of the present description.

If however, the monitoring agent 114 determines a plurality of LUNs have failed ('yes' path from block 304), the details of the each of the failed LUNs is communicated to the backup tracking module 116. The backup tracking module 116 based on the information received from the monitoring agent 114 determines a priority index associated with each of the failed LUNs (block 308). As discussed previously, the LUNs which were associated with data critical to business functions can be associated with higher priority index. Similarly, other data corresponding to other functions which otherwise is not considered critical would be associated with the lower priority index, Consequently, LUNs which have a priority index are used first for recovering data lost due to the failed LUNs. In one implementation, the priority information for each of the failed LUNs can be stored as priority information 216.

At block 310, the LUNs are listed and sorted based on the associated priority index. For example, the backup tracking module 116 lists and sorts the failed LUNs based on a decreasing order of priority. Once the LUNs are sorted based on the associated priority index, at block 312, the backup tracking module 116 determines the number of available backups for each of the failed LUNs. At block 314, if only one backup is available ('no' path from block 314), the method 300 proceeds to block 322. If however, the number of available backups is more than one ('yes' path from block 314) recovery policies associated with the failed LUNs is determined (block 316). For example, the backup tracking module 116 determines the appropriate backups based on the recovery policies 218.

As discussed previously, the recovery policies 218 associated with each of the LUNs can be based on a plurality of parameters, such as time of the backup, time required for recovering data from backup and nature of backup. Once the parameters are obtained, the required recovery policies 218 can be specified by assigning relative priorities to each parameter, such {1, 2, and 3} with 1 being the highest priority and 3 being the lowest.

At block 318, the recovery policy requirements are determined. For example, the backup tracking module 116 may further determine recovery policy requirements 222. The recovery policy requirements 222 may indicate the requirements based on which the original data is to be recovered. In most circumstances, the recovery policy requirements 222 may be based on different prerequisites which may have been specified as part of service level agreement (SLA), or can be based on Recovery Point Objective (RPO) or Recovery Time Objective (RTO) related considerations.

At block 320, once the recovery policy requirements 222 are determined, the backup tracking module 116 may compare the same with the recovery policies 218 associated with each of the multiple backups. Based on the recovery policies 218 and the policy requirements 222, the appropriate backups are identified.

At block 322, the appropriate backup is used for the recovering the data that was rendered unavailable due to the failed LUNs. For example, one or more recovery agents can be used for recovering the data based on the LUNs identified by the backup tracking module 116.

CONCLUSION

Although implementations for the present subject matter have been described in language specific to structural features and/or methods, it is to be understood that the appended claims are not necessarily limited to the specific features or methods described. Rather, the specific features and methods are disclosed as implementations for data backup and recovery.

We claim:

1. A data backup and recovery system comprising:
a processor; and
a monitoring agent coupled to the processor, the monitoring agent to determine backup related information associated with storage devices storing respective original data, wherein the backup related information specifies priority indexes associated with the storage devices, the priority indexes indicating respective priorities of the storage devices; and
a backup tracking module coupled to the processor, the backup tracking module to:
detect that a plurality of the storage devices have become unavailable;
select a first storage device of the plurality of the storage devices having a highest priority of the priorities indicated by the priority indexes; and
identify, for the first storage device that has become unavailable, at least one backup of the original data of the first storage device from a backup storage unit based on the backup related information, for recovering data corresponding to the original data of the first storage device.

2. The data backup and recovery system as claimed in claim 1, wherein the backup related information includes one or more of source of the original data of each storage device, type of application utilizing the original data of each storage device, and type and identity of storage unit storing the original data of each storage device.

3. The data backup and recovery system as claimed in claim 1, wherein each of the storage devices is identifiable by a logical unit number (LUN).

4. The data backup and recovery system as claimed in claim 1, wherein the monitoring agent is to monitor whether the original data stored on the plurality of the storage devices has become unavailable.

5. The data backup and recovery system as claimed in claim 1, wherein the backup tracking module is to further:
rank the plurality of the storage devices based on the respective priority indexes.

6. The data backup and recovery system as claimed in claim 5, wherein the backup tracking module is to recover data corresponding to the original data of the first storage device from the identified at least one backup.

7. The data backup and recovery system as claimed in claim 1, wherein the backup tracking module is to further identify the at least one backup of the original data of the first storage device from the backup storage unit based on at least one recovery policy associated with the first storage device.

8. A method of data recovery and backup, comprising:
determining, by a system including a processor, whether at least one storage device storing original data has failed;
obtaining, by the system, backup related information associated with the at least one failed storage device; and
identifying, by the system, at least one backup of the original data from a backup storage based on the backup related information and at least a recovery policy, for recovering data corresponding to the original data, wherein the identifying comprises:
determining available backups corresponding to the failed storage device;
determining the recovery policy associated with the failed storage device;
obtaining a recovery policy requirement for the failed storage device; and
identifying the at least one backup of the original data from the backup storage based on a comparison of the recovery policy and the recovery policy requirement.

9. The method as claimed in claim 8, wherein the at least one failed storage device comprises a plurality of failed storage devices, and wherein the determining further comprises:
determining a priority associated with each of the plurality of failed storage devices; and
ranking the plurality of failed storage devices based on an increasing order of the priorities.

10. The method as claimed in claim 8, wherein the recovery policy is based on one or more of time of backup, time needed for recovering data based on a backup, and nature of backup.

11. The method as claimed in claim 8, wherein the recovery policy requirements are based on one or more of Recovery Point Objective (RPO) requirements and Recovery Time Objective (RTO) requirements.

12. The method as claimed in claim 8, further comprising checking the at least one backup of the original data prior to recovery of data corresponding to the original data.

13. A non-transitory computer-readable storage medium storing computer readable instructions that, when executed, cause a backup and recovery system to:
determine whether at least one storage device storing original data has failed;
obtain backup related information corresponding to the at least one failed storage device;
determine a priority index associated with each of the at least one failed storage device;
rank each of the at least one failed storage device based on the priority index;
identify at least one backup of the original data from a storage unit based on the backup related information, wherein the backup related information includes at least one of recovery policies and recovery policy requirements; and
recover data corresponding to the original data of each of the at least one failed storage device, based on the at least one identified backup, in an order of the ranking of each of the at least one failed storage device.

14. The non-transitory computer-readable storage medium as claimed in claim 13, wherein the at least one identified backup of the original data is selected based on the recovery policies specified by associating a relative priority to a plurality of user-specified parameters.

15. The data backup and recovery system as claimed in claim 1, wherein the identifying comprises:
determining available backups corresponding to the first storage device that has become unavailable;
determining a recovery policy associated with the first storage device;
obtaining a recovery policy requirement for the first storage device; and
identifying the at least one backup of the original data of the first storage device from the backup storage unit based on a comparison of the recovery policy and the recovery policy requirement.

16. The method as claimed in claim 8, wherein the at least one storage device that has failed comprises a plurality of storage devices that have failed, the method further comprising:
receiving priority indexes of the plurality of storage devices, the priority indexes indicating respective priorities of the plurality of storage devices; and
selecting a first storage device of the plurality of storage devices having a highest priority of the priorities indicated by the priority indexes, wherein the identifying of the at least one backup of the original data from the backup storage is for the first storage device.

17. The non-transitory computer-readable storage medium as claimed in claim 13, wherein the identifying of the at least one backup of the original data from the storage unit is based on a comparison of a recovery policy of the recovery policies with a corresponding recovery policy requirement of the recovery policy requirements.

\* \* \* \* \*